No. 840,516. PATENTED JAN. 8, 1907.
O. RENNERT.
SWITCHING ARRANGEMENT.
APPLICATION FILED JAN. 12, 1903. RENEWED JUNE 17, 1905.
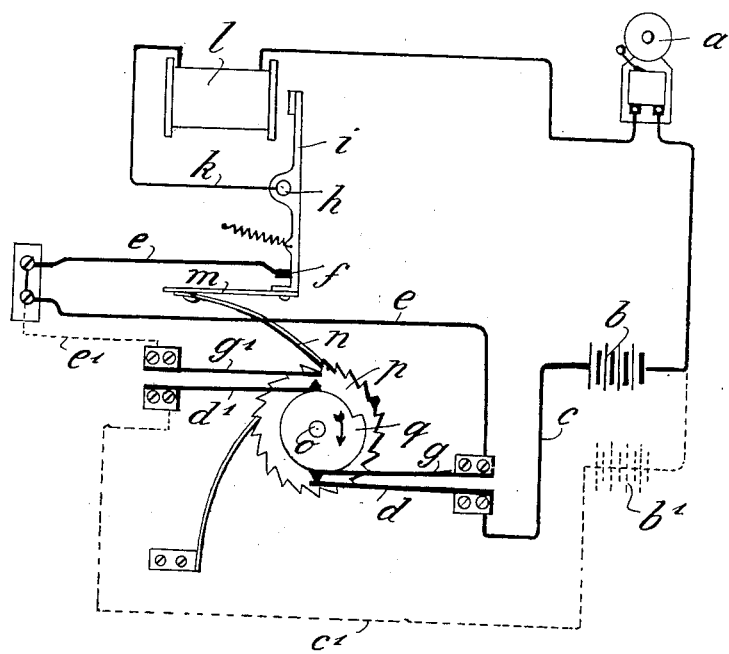
Witnesses—
Ellis Owen.
John Smith.
Inventor
O. Rennert.
by W. Edwards
Attorney.

UNITED STATES PATENT OFFICE

OTTO RENNERT, OF LONDON, ENGLAND.

SWITCHING ARRANGEMENT.

No. 840,516.  Specification of Letters Patent.  Patented Jan. 8, 1907.

Application filed January 12, 1903. Renewed June 17, 1905. Serial No. 265,765.

*To all whom it may concern:*

Be it known that I, OTTO RENNERT, a subject of the German Emperor, residing at Seagrave Road, West Brompton, London, England, have invented certain new and useful Improvements in and Relating to Switching Arrangements, of which the following is a specification.

The present invention relates to an arrangement which enables the alternate switching into circuit of a number of sources of electric power—for example, batteries and the like—so that for a certain time one battery is used while the other recuperates or is saved. This is effected by such means that an armature is attracted and repelled by an electromagnet lying in circuit, which armature by its movement causes a cam-disk to advance which alternately closes different contacts appertaining to the respective batteries.

In the accompanying drawing a specimen of the present switching arrangement is illustrated and in which two batteries are provided for the provision of the current.

In the consuming-circuit of a bell $a$ both batteries $b$ $b'$ are connected in parallel. The current flows from the battery $b$ through the wire $c$ and the contact-spring $d$. If this contact-spring $d$ lies in contact with the contact-spring $g$, which is adjacent to it, the current flows through the wire $e$ to the contact-piece $f$. An arm of the armature-lever $i$, which is pivoted at $h$, lies against this contact-piece $f$, so that the current flows through the wire $k$ into the magnet-coil $l$, and thence returns to the place of consumption. When the current flows through, the armature-lever $i$ is attracted and repelled in the usual manner, as in alarm-bells, this movement being utilized to alternately connect and disconnect the batteries $b$ and $b'$.

At the lower end of the armature-lever $i$ a spring-pawl $n$ is provided and is carried upon an arm $m$. This spring-pawl $n$ in the to-and-fro movement given to it by the armature-lever $i$ causes the ratchet-wheel $p$ to move in the direction of the arrow. A cam-disk $q$ is coupled with the ratchet-wheel $p$ upon the same spindle $o$, the cam projection of which disk presses the contact-springs $g$ and $d$ together, as shown in the drawings and thus enables the current to flow, as hereinbefore described, while it leaves disconnected at the same time two other contacts $g'$ $d'$, or it presses both contact-springs $d'$ $g'$ into contact with each other, while the contact-springs $d$ and $g$ remain out of contact. Both the contact-springs $d'$ $g'$ now connect the electromagnet $l$ in the circuit of the aforesaid battery $b'$, from which the current passes through the wire $c'$ to $d'$ and through $g'$ and the wire $e'$ into the electromagnet $l$. If, for example, the cam-disk $q$ is in such a position that in the use of the apparatus the contacts $d$ and $g$ close the circuit, and consequently the battery $b$ is in use, then the armature-lever $i$ causes the ratchet-wheel $p$ to move, by means of the spring-pawl $n$, until the contact is disconnected between $d$ and $g$. On this being effected, the contacts $d'$ $g'$ close the circuit, so that now the battery $b'$ furnishes the necessary current. It will be understood that in order to prevent the total disconnection of the batteries the cam projection is of such a length on the cam-disk $q$ that contact is made between $g'$ $d'$ before the contact between $d$ and $g$ is disconnected.

What I claim as my invention, and desire to secure by Letters Patent, is—

1. Means for alternately switching into and out of circuit a number of sources of electric current consisting of a number of sources of electric current, circuits within which said sources of current are connected, means for alternately closing the circuit of said sources of current comprising a ratchet-wheel and an electromagnetic device lying in the circuit in which the current flows, an armature for said electromagnetic device also in circuit the movement of which makes and breaks the circuit of said electromagnetic device, and a pawl for said armature by which the said ratchet-wheel may be rotated on the movement thereof, substantially as described 2. In an apparatus of the class described, the combination, with a circuit, and a plurality of sources of electricity for energizing said circuit, of an electromagnet included in said circuit, an armature for said electromagnet, said armature being arranged to control said circuit, a ratchet-wheel actuated by the armature, a cam operated by the ratchet-wheel and circuit-closers operated *seriatim* by the cam, said circuit-closers being arranged to connect and disconnect the respective sources of electricity to the said circuit.

In testimony whereof I have signed my name to this specification in the presence of two subscribing witnesses.

OTTO RENNERT.

Witnesses:
PAUL HENSEL,
WILLIAM EDWARD EVANS.